(No Model.)

P. H. McNAMARA.
VEHICLE AXLE.

No. 306,416. Patented Oct. 14, 1884.

WITNESSES

INVENTOR

Attorneys

UNITED STATES PATENT OFFICE.

PATRICK H. McNAMARA, OF TAUNTON, MASSACHUSETTS.

VEHICLE-AXLE.

SPECIFICATION forming part of Letters Patent No. 306,416, dated October 14, 1884.

Application filed June 21, 1884. (No model.)

*To all whom it may concern:*

Be it known that I, PATRICK H. MCNAMARA, a citizen of the United States, residing at Taunton, in the county of Bristol and State of Massachusetts, have invented a new and useful Vehicle-Axle, of which the following is a specification, reference being had to the accompanying drawings.

My invention relates to axles for vehicles; and it has for its object to provide a device of this character in which all noise will be prevented caused by the rattling of parts, &c.; and a further object of the invention provides means for tightening the parts.

The invention consists in the improved construction and combinations of parts, hereinafter fully described, and pointed out in the claim.

Figure 1:
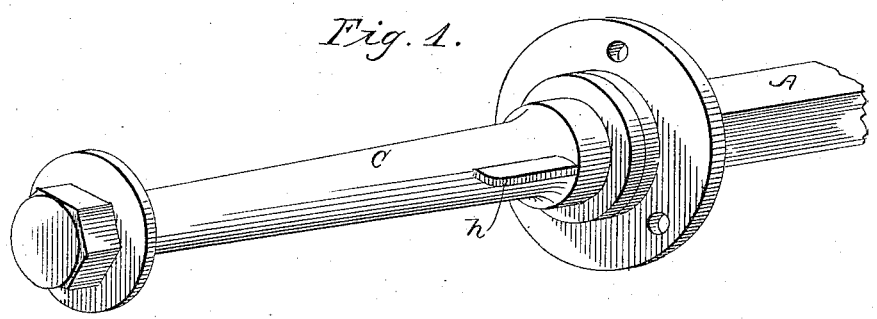
Figure 2:
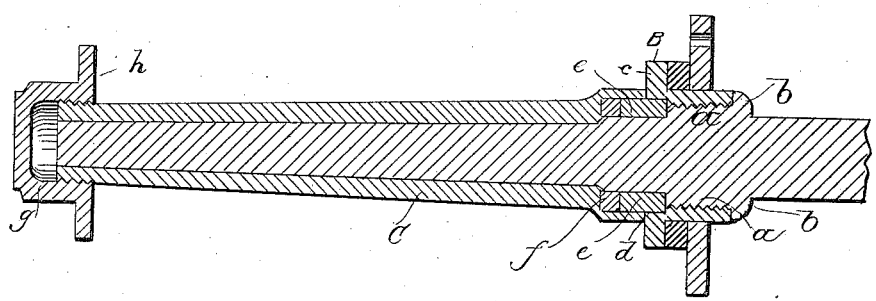
Figure 3:
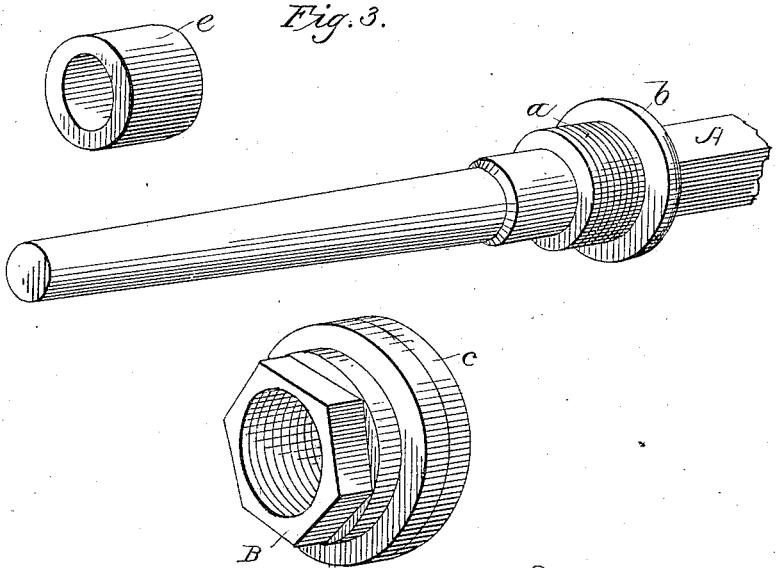

In the drawings, Figure 1 is a perspective view of an axle constructed in accordance with my invention. Fig. 2 is a longitudinal section of the same, and Fig. 3 is a detail view of the tightening-nut, spindle, and frictional washer detached.

In the accompanying drawings, in which like letters refer to corresponding parts in all the figures, A represents the axle-spindle, formed at its rear end with a screw-threaded shoulder, $a$, terminating at its rear end in an annular flange, $b$.

B represents a nut or washer, which is interiorly screw-threaded to engage the screw-threaded end of the spindle. Upon the forward end of this nut or washer is provided an annular flange, against the rear wall of which bears a washer or packing of leather or other suitable material. The rear end of this washer, when screwed up tight upon the threaded shoulder, bears against the shoulder $b$. The flange $c$, which is formed on the forward end of the washer or nut B, provides an inner shoulder, $d$, which rests or bears against a frictional washer or ring, $e$, which is adapted to turn on said shoulder. The rear end of the nut or washer B is squared, in order that it may be tightened by the use of a wrench, for a purpose to be described. Upon the said washer B, just in front of the squared portion, is provided a ring, which is provided with holes or openings for its attachment to the hub of a wheel.

C represents the axle-box, which is provided at its inner end and inside said end with a shoulder, $f$, resting against which shoulder is a packing of leather. As the frictional ring is not entirely inclosed by the washer B, it will be seen that when the box C is placed on the spindle A the said box will enter or fit upon said ring as far as the shoulder $f$, further movement than that point being prevented by the same. The outer end of this box is screw-threaded exteriorly to receive a screw-threaded cap, $g$, which fits thereon and incloses the outer end of the spindle, said box being provided with a flange, $h$, which bears against the hub.

By the improved construction shown and described all noise of the parts when a vehicle is in motion is prevented. Upon turning the nut B the parts may be readily tightened should they at any time become loosened. It will also be seen that the frictional ring may be readily replaced, should it become worn, at a slight cost.

Having fully described my invention, what I claim as new, and desire to secure by Letters Patent, is—

The combination, with the axle-spindle formed at its inner end with a screw-threaded shoulder, and a flange formed at the inner end of said shoulder, of a nut or washer engaging said shoulder, said nut being provided at its outer end with an annular flange, a ring and packing interposed between said ring and flange, said washer being also formed with an inner flange, an axle-box formed at its inner end with an interior flange, and a frictional washer, substantially as set forth.

In testimony that I claim the foregoing as my own I have hereto affixed my signature in presence of two witnesses.

PATRICK H. McNAMARA.

Witnesses:
  JAMES H. DEAN,
  JOHN C. REYNOLDS.